(12) United States Patent
Brosius

(10) Patent No.: US 6,394,711 B1
(45) Date of Patent: May 28, 2002

(54) ROTARY CUTTING TOOL AND HOLDER THEREFOR

(75) Inventor: Timothy L. Brosius, Arcade, NY (US)

(73) Assignee: Tri-Cel, Inc., Cheektowaga, NY (US)

( * ) Notice: Subject to any disclaimer, the term of this patent is extended or adjusted under 35 U.S.C. 154(b) by 0 days.

(21) Appl. No.: 09/536,673

(22) Filed: Mar. 28, 2000

(51) Int. Cl.$^7$ ................................................ B23B 31/11
(52) U.S. Cl. .............................. 408/57; 279/8; 408/233; 408/239 R
(58) Field of Search ............................. 279/8, 143, 145; 409/233; 408/57, 59, 231, 233, 226, 239 A, 239 R

(56) References Cited

U.S. PATENT DOCUMENTS

| | | | |
|---|---|---|---|
| 1,475,514 A | * 11/1923 | Ross | ............................ 408/226 |
| 3,164,041 A | * 1/1965 | Carlstedt | ................. 408/239 R |
| 4,929,131 A | * 5/1990 | Allemann | .................... 408/233 |

FOREIGN PATENT DOCUMENTS

| | | | | |
|---|---|---|---|---|
| CH | 251186 A | * | 10/1947 | ..................... 279/8 |
| DE | 871990 A | * | 3/1953 | .................. 408/226 |
| FR | 1014417 A | * | 6/1952 | .................. 408/226 |
| FR | 1017317 A | * | 12/1952 | ..................... 279/8 |

* cited by examiner

*Primary Examiner*—Daniel W. Howell
(74) *Attorney, Agent, or Firm*—James J. Ralabate

(57) ABSTRACT

This invention relates to a rotary cutting tool and holder wherein the holder comprises an elongated shank having an internal channel and a conical seat at one end adapted to receive a rotary cutting tool; and a thru pin adapted to fit within the channel. In position, a threaded end of the thru pin projects within the conical seat for attachment of the rotary cutting tool. The attachment end of the rotary cutting tool is conical in shape and designed to fit conformably into the conical seat of the holder. An internal bore through the thru pin and cutting tool permits the transmission of coolant/lubricant to outlets in the cutting head of the cutting tool. The cutting tool is easily removed and replaced for maintenance or other purposes.

4 Claims, 2 Drawing Sheets

ROTARY CUTTING TOOL AND HOLDER THEREFOR

BACKGROUND OF THE INVENTION

1. Field of the Invention

The invention relates to a rotary cutting tool and holder having an internal channel for coolant/lubricant extending axially through the holder and the cutting tool.

2. Prior Art

It is known to use extended holders and replaceable cutting tools for different types of cutting and cutting operations, such as drilling, milling, machining and the like with internal channels for the passage of coolants and/or lubricants to the cutting edge. However, the prior art devices are often unstable at high rotational speeds as a result of vibration due to imbalance. Furthermore, the replacement of cutting tools for maintenance or other purposes is often inconvenient, resulting in greater amounts of down time when it is necessary to replace a cutting tool.

U.S. Pat. No. 4,950,108 to Roos discloses a drill having replaceable drill tips and a central channel for the passage of flushing fluid.

U.S. Pat. No. 5,599,145 to Reinauer et al. discloses a drill comprising a cylindrical holder and having interchangeable cutting inserts and internal coolant channels.

U.S. Pat. No. 5,851,094 to Strand et al. discloses a milling tool comprising a shank defining an axis of rotation with a replaceable cutting head mounted in the shank and a central channel for the transmission of flushing medium.

U.S. Pat. No. 5,980,166 to Ogura discloses a rotary tool, such as a drill, with a shank having a narrow internal channel for the transmission of fluid.

It is an object of the present invention to provide a rotary cutting tool and holder wherein the cutting tool can be conveniently removed and replaced for maintenance or other purposes.

It is a further object to provide a rotary cutting tool and holder wherein the cutting tool can be selected from various interchangeable cutting tools for various purposes.

It is a still further object to provide a rotary cutting tool holder and conveniently replaceable cutting tools and having an internal channel for the transmission of fluid, such as coolants to the cutting surface.

SUMMARY OF THE INVENTION

The above and other objects are accomplished in accordance with the present invention which provides a rotary cutting tool and holder wherein the holder comprises A) an elongated shank, defining an axis of rotation, and having an internal channel along the axis of rotation, and forming at one end thereof, a tapered seat adapted to receive a rotary cutting tool;

B) a thru pin adapted to fit within said channel and having an internal bore along the length thereof for the passage of liquid therethrough, and having an external male threaded end adapted to be positioned centrally within the tapered seat when the thru pin is in position within the channel; and the rotary cutting tool comprises a cutting end and an attachment end, the attachment end having a tapered external shape, adapted to fit conformably within the tapered seat of the holder, and an internal female thread adapted to engage the external male threaded end of the thru pin.

In assembling the cutting tool and holder, the thru pin is positioned within the holder and the threaded end of the thru pin is screwed into the internal thread of the attachment end of the cutting tool holding it tightly in place against the tapered seat. In one embodiment the tapered seat and conformably tapered attachment end of the cutting tool may be rectangular in cross-sectional shape. In this case the external threads of the thru pin may be screwed into the cutting tool by turning the thru pin for example with the aid of an Allen wrench and an Allen fitting at the opposite end of the thru pin. In a preferred embodiment, the tapered seat in the holder is conical, that is, having a circular cross-sectional shape and the cutting tool can be turned as it enters the seat, to screw it onto the threaded end of the thru pin until the attachment end of the cutting tool is pulled tight against the seat.

The cutting end of the rotary cutting tool may be designed for various conventional operations utilizing rotary tools, for example, for drilling, milling, cutting, grinding, sawing, or other such operations generally known to those skilled in the art.

BRIEF DESCRIPTION OF THE DRAWINGS

The present invention and the manner in which it may be practiced are further illustrated with reference to the accompanying drawings wherein.

DETAILED DESCRIPTION OF THE DRAWINGS

Figure 1:
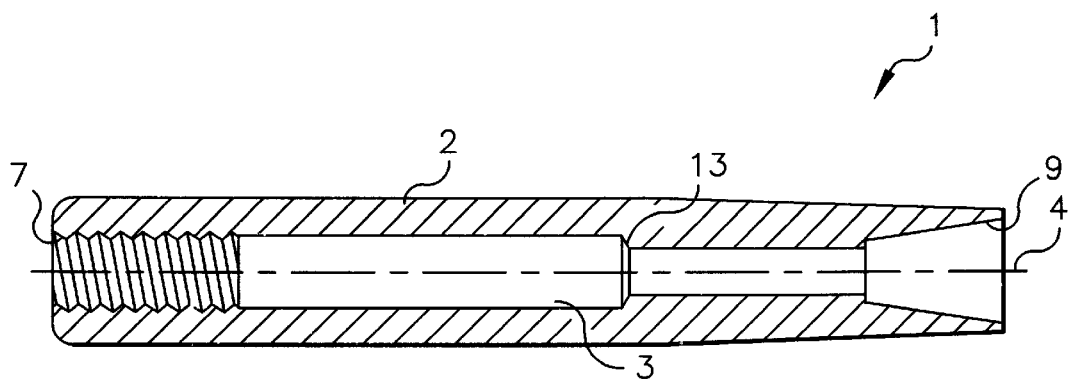
FIG. 1 illustrates a cross-sectional view of an outer shank of a tool holder in accordance with the present invention.
Figure 2:
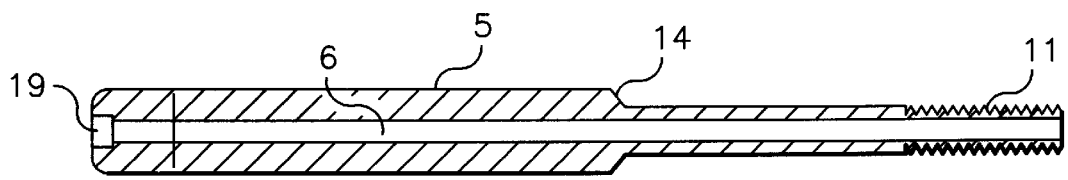
FIG. 2 is a cross-sectional view of a thru pin component of a tool holder according to the invention.
Figure 3:
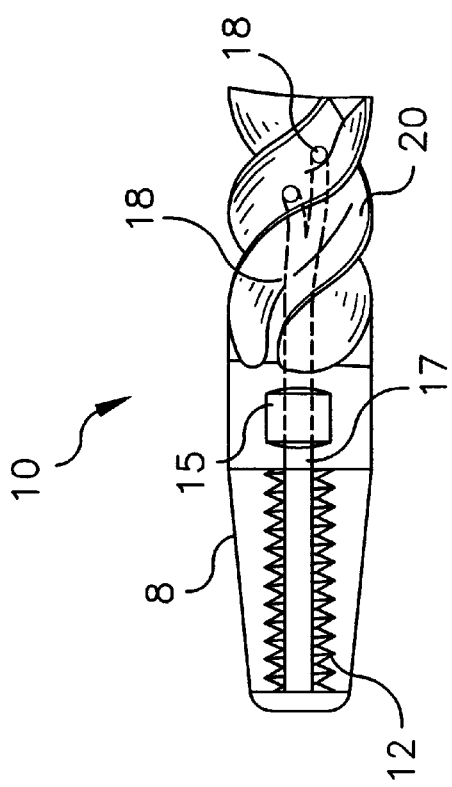
FIG. 3 is a perspective view with some features shown in cross-section for clarity, of a cutting tool according to the invention.

The tool holder of the invention, as illustrated in the embodiment depicted in FIGS. 1 and 2, comprises an elongated shank 2, having an internal channel 3 along its axis of rotation 4 having female threads 7 at one end and an outwardly expanding channel portion at the other end and a thru pin 5 (FIG. 2) adapted to fit within channel 3. The outwardly expanding portion of channel 3 forms a tapered seat 9 having an inwardly directed taper with a cross-sectional shape conformable to the outer tapered attachment end 8 of cutting tool 10 (FIG. 3).

Figure 4:
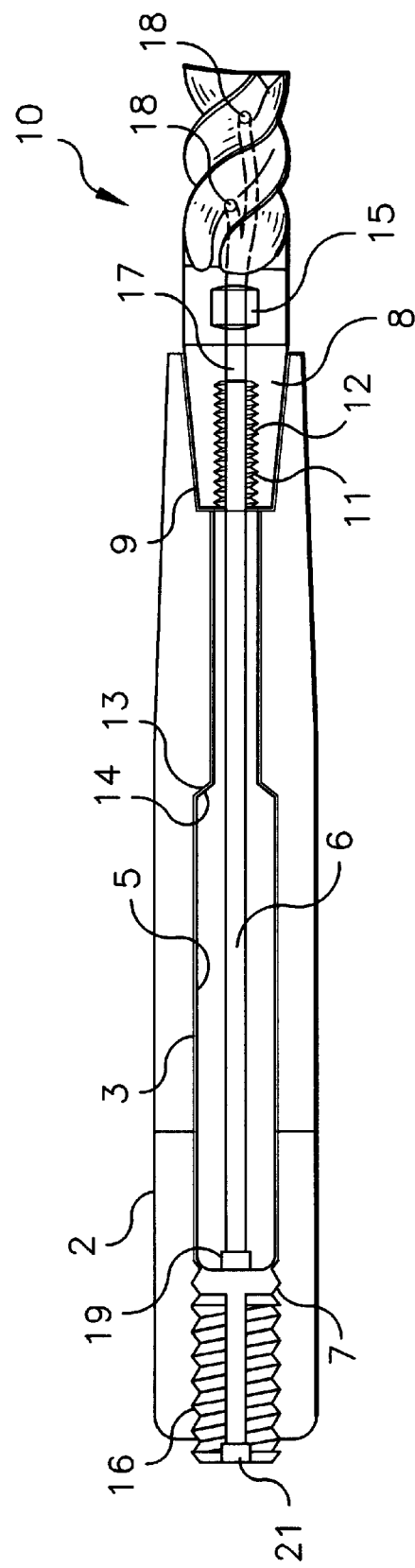
FIG. 4 is a partial cut-away view of an assembled cutting tool and holder according to the invention.

Internal channel 3 is sized and shaped to allow the insertion of thru pin 5 therein. As illustrated in FIG. 4., when thru pin 5 is positioned in channel 3, male threads 11 project into tapered seat 9 portion of channel 3, where they may be threaded into female threads 12 of cutting tool 10. When the thru pin is threaded tightly into the attachment end of the cutting tool, the tapered attachment end 8 of the cutting tool is drawn into tapered seat 9 until shoulder 14 of the thru pin rests against the channel 3 at restriction 14. A hexagonal opening 19 suitable for use with an Allen wrench (not shown) is provided at one end of channel 3 for use, if desired in assembling or disassembling the tool holder and cutting tool.

Thru pin 5 provides an internal bore 6 for the transmission of cooling/lubricant fluid to the cutting tool 10 during use. The cutting tool is provided with a bore 17 which is in fluid communication with bore 6 when the cutting tool is seated as in FIG. 4. During use, fluid received from bore 6 may be transmitted through bore 17 to outlets 18, in or near the cutting end 20 of the cutting tool. The path of internal bore 17 and the positioning of outlets 18 are shown as an example. However, it will be understood that various paths may be used and outlet positioning varied according to the particular cutting tool, type of cutting operation, and fluid employed.

Channel 3 and thru pin 5 are preferably cylindrical in cross-sectional shape. However, the portion of channel 3 that forms the tapered seat 9 may vary in shape, provided it is shaped conformably to attachment end 8 of the cutting tool 10 so that the cutting tool may be drawn in and held tightly. When the cross-sectional shape of the tapered seat 9 is other than circular, for example, rectangular, the cutting tool cannot be turned to thread onto threads 11 of the thru pin. In this instance, thru pin 5 must be turned. This may be conveniently accomplished by providing a suitable fitting (not shown) in the end of channel 5 to allow the turning of the thru pin with an appropriate tool, such as an Allen wrench.

In a preferred embodiment, tapered seat 9 and tapered attachment end 8 of the cutting tool are circular in cross-section and thus, conical in shape. In this embodiment, the cutting tool 10 may be mounted conveniently by turning the cutting tool to cause threads 12 to screw onto threaded end 11 of the thru pin. This may be facilitated with the aid of a set wrench or adjustable wrench held at the wrench grip flattened surface 15 of the cutting tool. Preferably, the thru pin is secured within holder 1 by means of set screw 16 when it is screwed into threads 7 at the end of channel 3. Threading of the set screw 16 into the threaded end of the holder may be facilitated with the aid of an Allen wrench (not shown) fitted into the hexagonal opening 21. With the thru pin secured in this manner, the rotary cutting tool can be removed and replaced conveniently by simply unscrewing it from the threaded end of the thru pin and replacing it with another cutting tool.

Although the invention has been described with reference to certain preferred embodiments, it will be appreciated that modifications and variations may be made without departing from the spirit and scope of the invention as defined in the accompanying claims.

What is claimed is:

1. A rotary tool holder comprising:
   A) an elongated outer shank having an axis of rotation, and having an internal channel along said axis of rotation, open at each end with a tapered seat at one end adapted to receive a rotary cutting tool;
   B) a thru pin adapted to fit within said channel and having an external threaded end; said threaded end projecting centrally into said tapered seat when said thru pin is positioned within said channel;
   C) said thru pin having an internal bore extending axially therethrough, said internal bore adapted to permit the transission of fluids therethrough;
   D) said thru pin is secured in place with the aid of a set screw axially positioned and threaded into said internal channel.

2. A rotary tool holder according to claim 1 in combination with a rotary cutting tool having a cutting end and an attachment end, said attachment end having an external shape adapted to fit conformably within said tapered seat and an internal female thread adapted to engage said external threaded end of said thru pin.

3. A rotary tool holder according to claim 1 wherein said tapered seat is a conical seat and said attachment end of said rotary cutting tool has a conical shape adapted to fit conformably within said conical scat when said external threaded end is engaged with said internal female threads of said rotary cutting tool.

4. A rotary cutting apparatus comprising
   A) an elongated holder having a shank, defining an axis of rotation, said shank having an internal channel along said axis of rotation, open at each end with internal threads at one end of said channel and a conical seat adapted to receive a rotary tool at the other end;
   B) a thru pin adapted to fit within said channel and having an internal bore along the length thereof for the passage of liquid therethrough and having an external threaded end; said threaded end projecting centrally into said conical seat when said thru pin is positioned within said channel;
   C) a set screw adapted to thread into said internal threads in said elongated holder and hold said thru pin in position within said channel, the set screw having an internal bore extending axially therethrough and in fluid communication with said internal bore of said thru pin when the thru pin and set screw are in place within said elongated holder;
   D) a rotary cutting tool having a cutting end and an attachment end and an internal bore for the transmission of fluid, said attachment end having an external shape adapted to fit conformably within said conical seat and an internal female thread adapted to engage said external threaded end of said thru pin; said rotary cutting tool having an axially extending internal bore in fluid communication with said internal bore of said thru pin for the transmission of fluid to at least one outlet at said cutting end.

* * * * *